(12) United States Patent
Mareachen et al.

(10) Patent No.: US 9,171,365 B2
(45) Date of Patent: Oct. 27, 2015

(54) DISTANCE DRIVEN COMPUTATION BALANCING

(71) Applicants: KABUSHIKI KAISHA TOSHIBA, Tokyo (JP); Toshiba Medical Systems Corporation, Otawara-shi (JP)

(72) Inventors: Russell Mareachen, Vernon Hills, IL (US); Vincent Pierre, Vernon Hills, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 116 days.

(21) Appl. No.: 14/093,326

(22) Filed: Nov. 29, 2013

(65) Prior Publication Data

US 2015/0154747 A1    Jun. 4, 2015

(51) Int. Cl.
*G06K 9/00*  (2006.01)
*G06T 7/00*  (2006.01)

(52) U.S. Cl.
CPC .................. *G06T 7/0012* (2013.01)

(58) Field of Classification Search
CPC .................................. G06T 7/0012
USPC .............................. 382/128–132
See application file for complete search history.

(56) References Cited

U.S. PATENT DOCUMENTS

| | | | |
|---|---|---|---|
| 6,724,856 B2 * | 4/2004 | De Man et al. | 378/62 |
| 7,227,893 B1 * | 6/2007 | Srinivasa et al. | 375/240.08 |
| 7,227,982 B2 | 6/2007 | DeMan et al. | |
| 7,742,557 B2 * | 6/2010 | Brunner et al. | 378/4 |
| 2002/0122528 A1 * | 9/2002 | Besson | 378/4 |

OTHER PUBLICATIONS

Distance-driven projection and backprojection, B. De Man and S. Basu, pp. 1477-1480, IEEE 2003.
Branchless Distance Driven Projection and Backprojection, Samit Basu and Bruno De Man, CT Laboratory, GE Global Research, One Research Circle, Niskayuna, NY, Computational Imaging IV, SPIE vol. 6065.

* cited by examiner

*Primary Examiner* — Shefali Goradia
(74) *Attorney, Agent, or Firm* — Oblon, McClelland, Maier & Neustadt, L.L.P.

(57) ABSTRACT

Methods for improving the processing time, scalability, and resource usage for three-dimensional projecting-backprojecting rays with respect to voxels (pixels) and detector bins are provided. Specifically, improvements to a distance-driven technique, wherein the pixels and detector edges are projected on to a predetermined reference plane are disclosed. The methods balance the computational load of a system of parallel processors, which results in a balanced memory and cache access operations, while reducing the computational complexity of projection-backprojection techniques in scanning systems.

17 Claims, 6 Drawing Sheets

DISTANCE DRIVEN COMPUTATION BALANCING

FIELD

Embodiments disclosed herein generally relate to the processes of reprojection-backprojection performed in computed tomography (CT) imaging or cardiovascular X-ray and CT. In particular, embodiments disclosed herein relate to methods for improving the processing time, resource usage, and scalability in the reprojection-backprojection processes that are performed while implementing a distance-driven projection algorithm.

BACKGROUND

Radiographic imaging, in its simplest expression, is an X-ray beam traversing an object and a detector relating the overall attenuation per ray. From this conceptual definition, several steps are required to properly construct an image. Several elements affect how the actual image reconstruction is performed.

In computed tomography, the operation that transforms an N-dimension image into an N-dimension set of line integrals is called a forward projection or reprojection. One example of this operation is the physical process that generates an X-ray image of an object. After logarithmic conversion, an X-ray image is well approximated as the line integral projection of the distribution of the object's linear attenuation coefficient. The transpose operation is called backprojection. This technique is used in filtered backprojection and in iterative reconstruction, which are used in conventional reconstruction algorithms.

The methods for reprojection and backprojection in X-ray and CT systems can be generally classified as ray-driven methods or pixel-driven methods. A critical drawback associated with these methods is that they introduce artifacts in the constructed image.

A distance-driven method addresses the above issues. However, the distance-driven method for projection-backprojection incurs a significant number of processing operations (i.e., weighting and multiplication operations) that tend to increase the image reconstruction time. Further, a subset of the processing operations may not contribute significantly to the reconstruction of the image. Thus, in a parallel computing environment, the processing time for a subset of processors increases, which creates a computing imbalance. This computing imbalance creates a potentially unbalanced number of memory and cache accesses that affect the bandwidth optimization of the CT system.

Accordingly, methods for improving the overall image reconstruction time in reprojection-backprojection processes, wherein the computation operations are balanced across a set of processors, is required.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

In one embodiment, there is provided a method of reducing computation time in distance-driven reprojection from an image space having a plurality of pixels for a scanning system, the scanning system including a detector having a plurality of detector elements, the method comprising: (1) determining, for a given view and for each detector element of the plurality of detector elements, a projection location of each edge of the detector element onto a predetermined reference axis; (2) determining, for the given view and for each pixel of the plurality of pixels, a projection location of each edge of the pixel onto the predetermined axis; (3) identifying, for each detector element, contributing pixels having corresponding pixel values that contribute to a detector value of the detector element, based on the projection location of each edge of the detector element and the projection location of each edge of the plurality of pixels; (4) scheduling parallel computations for the detector elements in each processing cycle of the scanning system, based on a number of processors included in the scanning system; and (5) calculating, based on the scheduled parallel computations, the detector value of each detector element as a sum, over the total number of contributing pixels, of the corresponding pixel values of the contributing pixels, each pixel value being weighted by a corresponding weight.

In another embodiment, the method further includes sorting the projection locations of the edges of the detector elements and the projection locations of the pixel edges on the predetermined reference axis.

In another embodiment, the step of determining the projection location of each edge of each detector element on the predetermined reference axis comprises determining an intersection point with the predetermined reference axis of a ray connecting an X-ray source and the edge of the detector element.

In another embodiment, the step of determining the projection location of each edge of each pixel comprises determining an intersection point with the predetermined reference axis of a ray connecting an X-ray source of light and a mid-point of the pixel edge.

In another embodiment, the method further includes setting the predetermined threshold value to an average number of contributing pixels of all detector elements.

In another embodiment, the classifying step comprises classifying a detector element as a first type of detector element when the total number of contributing pixels for the detector element is less than the predetermined threshold value, and classifying the detector element as a second type of detector element when the total number of contributing pixels for the detector element is greater than the predetermined threshold value.

In another embodiment, the calculating step comprises calculating, for each detector element, the weight of each pixel in the contributing pixels as an amount of intersection between a first segment defined by the projection locations of the edges of the pixel on the predetermined reference axis and a second segment defined by the projection locations of the edges of the detector element on the predetermined reference axis, divided by the length of the second segment.

In another embodiment, the calculating step comprises calculating, for each detector element j, the detector value $d_{j,j+1}$ as:

$$d_{j,j+1} = \frac{\sum_{i=1}^{l} p_{i,i+1} \cdot |(p_i, p_{i+1}) \cap (d_j, d_{j+1})|}{d_{j+1} - d_j}$$

wherein $d_j$, and $d_{j+1}$ are the projection locations of the edges of the detector element on the predetermined reference axis, $p_{i,i+1}$ is the pixel value of the ith contributing pixel for the detector element, $p_i$ is the projection location of a first edge of the ith contributing pixel for the detector element, and $p_{i+1}$, is the projection location of a second edge of the ith contributing pixel for the detector element.

In another embodiment, the method further comprises: (1) grouping computations for the detector elements based on complexity; and (2) regrouping equal complexity computations based on data required to perform the computation.

In another embodiment, the method further comprises filtering computations for the detector elements based on a resultant value of computation.

In another embodiment, the filtering step comprises filtering the computation if the resultant value of the computation is less than a threshold value.

In another embodiment, the method further comprises classifying each detector element as a first type of detector element or a second type of detector element based on a total number of contributing pixels for each detector element and a predetermined threshold value, wherein the scheduling step comprises scheduling the parallel computations for the first type of detector elements and the second type of detector elements in each processing cycle of the scanning system, based on the number of processors included in the scanning system.

Figure 1:
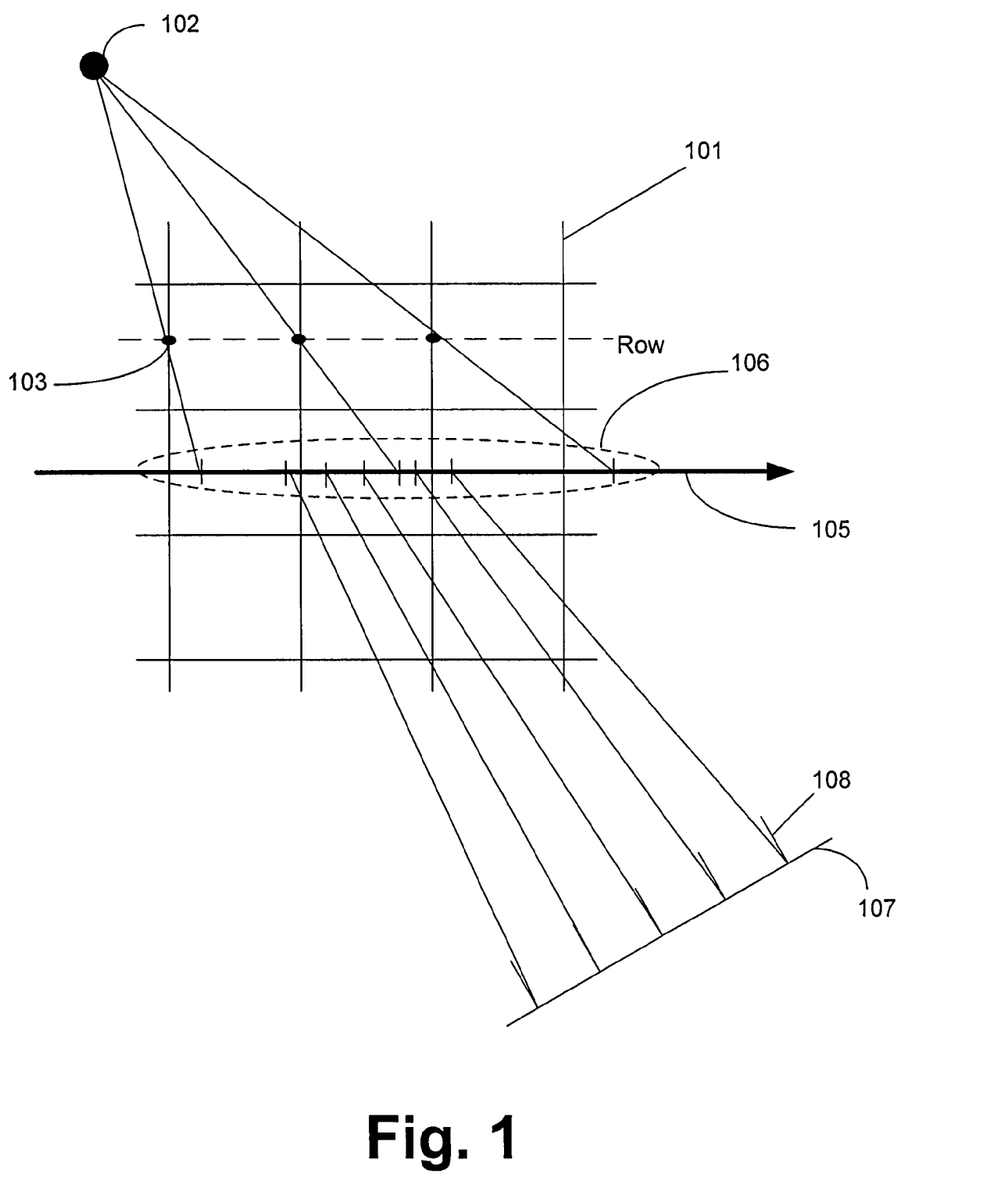
FIG. 1 depicts a distance driven projection of pixel and detector bin edges on a reference axis.

FIG. 1 depicts a distance-driven projection of pixels and detector bin edges on a predetermined reference axis 105. The grid 101 depicts a pixel image reconstruction grid, which is fixed in a three-dimensional coordinate system, onto which pixels are mapped in accordance with data acquired in response to a ray being projected from a source 102 to the detector 107. Each of the squares in these grids depicts a pixel. For fast computations, all detector edges 108 and pixel edges 103 are projected onto an arbitrarily selected line, which can be, for example, the x- or y-axis of the image.

In order to define a continuous mapping of image pixels and detector-bins, firstly, all the detector bin edges are projected onto the x-axis (or the y-axis or an arbitrarily determined axis). Next, all the image rows (or columns) are looped over and the pixel edges are projected onto the axis. Note that for the sake of simplicity, in FIG. 1, only a single row's pixel edges are shown to be projected on the reference axis 105. A set of projections 106 is thus obtained from the projection of the pixel edges and the detector bin edges onto the reference axis. Further, a value is read from the image, weighted with the appropriate segment length defined between projections, and assigned to the detector bin or pixel as the case demands. This is explained in detail with reference to FIG. 2.

Figure 2:
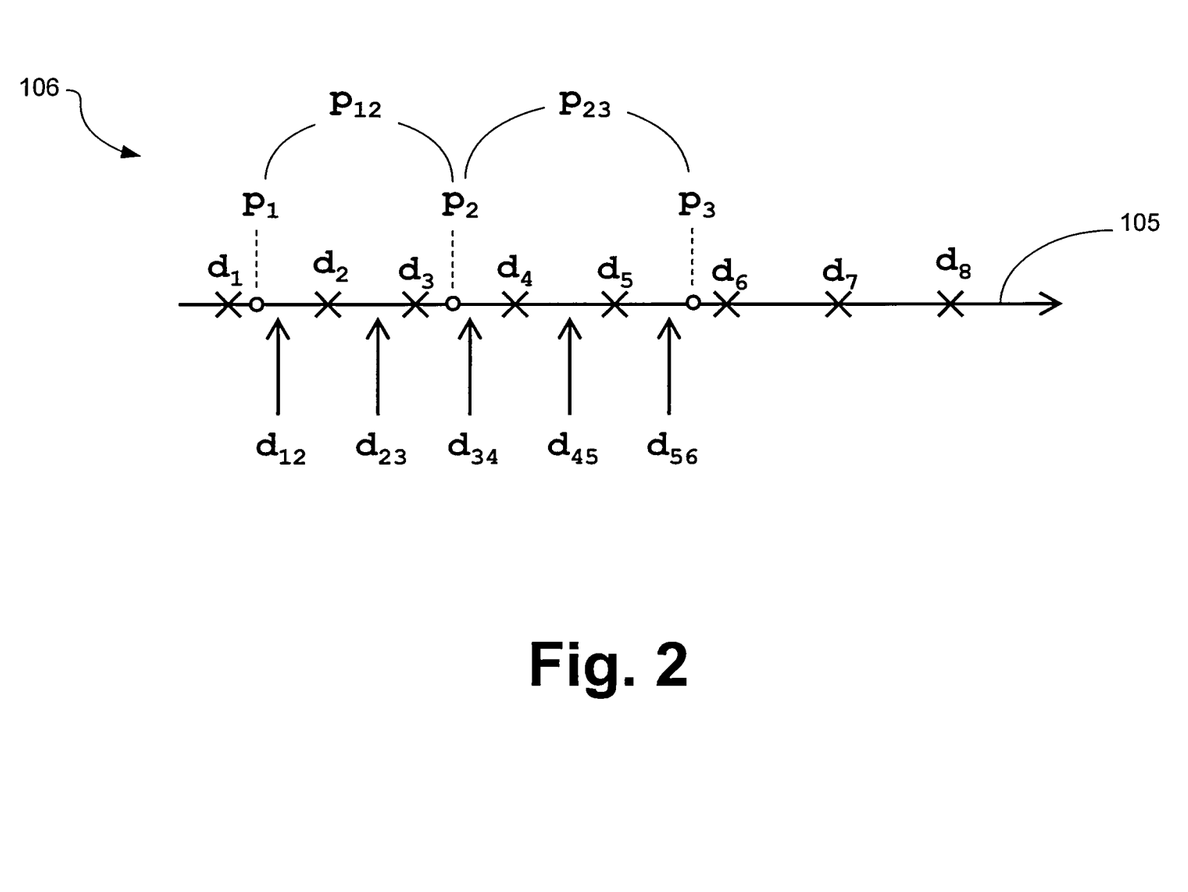
FIG. 2 is a closer view depicting an interlaced pattern of the distance driven projection of the pixels and detector bin edges on the reference axis.

FIG. 2 shows a more detailed view of the interlaced pattern 106 of detector bin edges $d_i$, pixel edges $p_i$, detector values $d_{ij}$, and pixel values $p_{ij}$ projected onto the reference axis 105. Note that the detector value $d_{ij}$ corresponds to the value assigned during reprojection to the detector bin that is formed by edges $d_i$ and $d_j$. Similarly, the pixel value $p_{ij}$ corresponds to the pixel value assigned to the pixel that is formed by the pixel edges $p_i$ and $p_j$, during backprojection. In this example, the contribution of the row under consideration to the ray sums $d_{ij}$ can be written as:

$$d_{23} = p_{12}; \quad (1)$$

$$d_{34} = p_{12};$$

$$d_{45} = \frac{(p_2 - d_4) \cdot p_{12} + (d_3 - p_2) \cdot p_{23}}{d_5 - d_4}$$

Further, the backprojection, the pixel values can be expressed as follows:

$$p_{12} = \frac{(d_2 - p_1) \cdot d_{12} + (d_3 - d_2) \cdot d_{23} + (d_4 - d_3) \cdot d_{34} + (p_2 - d_4) \cdot d_{34}}{p_2 - p_1} \quad (2)$$

Note that the entries expressed in parentheses in (1) and (2) correspond to the overlapping regions (specifically, the length of the region along the reference axis), contributing to the respective detector (pixel) values.

Further, in a manner similar to the computation as shown in (1), the pixel value for $p_{23}$ can be expressed as a normalized weighted sum of the detector values $d_{45}$, $d_{56}$ and $d_{67}$ as shown below:

$$p_{23} = \frac{(d_5 - p_2) \cdot d_{45} + (d_6 - d_5) \cdot d_{56} + (p_2 - d_6) \cdot d_{67}}{p_5 - p_2} \quad (3)$$

Thus, in general, the detector values $d_{j,j+1}$ can be expressed as:

$$d_{j,j+1} = \frac{\sum_{i=1}^{l} p_{i,i+1} \cdot |(p_i, p_{i+1}) \cap (d_j, d_{j+1})|}{d_{j+1} - d_j} \quad (4)$$

wherein $p_{i,i+1}$ is the pixel value of a pixel whose edges project to locations $p_i$ and $p_{i+1}$ on the reference axis. Similarly, $d_{j,j+1}$ is the detector value assigned to the detector whose edges project to locations $d_j$ and $d_{j+1}$ on the reference axis. The parameter $|(p_i,p_{i+1}) \cap (d_j,d_{j+1})|$, referred to as a weight, represents the magnitude of the overlap between two segments, wherein the first segment has a length from the pixel projection $p_i$ to pixel projection $p_{i+1}$, and the second segment has a length from detector edge projection $d_j$ to detector edge projection $d_{j+1}$.

From FIG. 1 and (1)-(4), it is clear that in order to compute a detector (or pixel) value, summation of all the intersecting regions defined by the projection of the pixel edges and detector edges on the reference axis needs to be computed. Note, that for computing a particular detector (or pixel) value, the number of overlapping regions depends upon the orientation of the pixels, the source, and the detector. Thus, the computation involved in processing the detector (pixel) values varies based on the number of overlapping regions, which in turn results in a variable calculation time for computing each detector (pixel) value.

In what follows, specific details of a CT system are first described and the methods used to balance the computational processing operations involved in the distance driven reprojection-backprojection processes are outlined in detail.

The CT image processing system includes a pre-computing unit referred to herein as a computation balancing unit (CBU). The CBU is configured to process either a single view at a time or can process all the captured views before the commencement of the image processing in the CT system.

According to one embodiment of the disclosure, the CBU is configured to process only a single view at a given time instance. In doing so, note that while the CBU is processing a given view (to be discussed below), the CT system processes an earlier view that is already processed by the CBU. Thus, the image processing system and the CBU may operate concurrently, thereby reducing any idle time of the system. Thus, the system performance is increased.

The CBU processes each view wherein it determines, for each detector/pixel element value that is to be computed (by reprojection/backprojection techniques), a set of all intersecting regions for that element. Note that the CBU can precompute the intersecting regions by using a simple geometrical calculation (as depicted in FIG. 1), without actually processing the actual data. Having performed this pre-computation, and based on the knowledge of the total number of processors in the CT system, the CBU can balance the computational load between different processors by assigning the associated computation tasks to different processors based on certain predetermined criteria.

Specifically, the CBU can assign a subset of computations to be performed for a detector element to at least a subset of processors that are idle. For instance, let there be three intersecting regions that contribute towards computing a detector value for detector element A. Further, let there be seven intersecting regions that contribute towards computing a detector value for detector element B. If the image processing system has a total of five processors, three processors can be used during the processors' first cycle to perform the weighting for detector element A. Since there are two processors that are still available during this first cycle, they can be used to perform the weighting for two (out of seven) contributing intersecting regions for detector element B. This partial result for detector B is then buffered, and the remaining five intersection weightings are performed during the second cycle. The partial results of both cycles are then summed together to calculate the final value of detector element B.

As stated previously, the CBU is configured to precompute the intersecting regions for each detector/pixel element. Once the pre-computation regarding the number of intersecting regions that contribute towards the calculation of the respective detector/pixel elements is performed, the CBU can compute the average number of intersection regions for all detector elements.

Further, the detector/pixel elements are classified into two types: "normal" elements and "corner" elements, based on the number of overlapping (intersecting) regions that contribute towards the computation of the detector/pixel value. Specifically, for a given element, if the number of contributing intersecting regions are less than the computed average number of intersecting regions (computed over all elements), the particular element is classified as a normal element. If the number of contributing intersecting regions for the element is greater than the computed average number of intersecting regions, the detector/pixel element is classified as a corner element.

Furthermore, note that for the case of corner elements, the processing may need to be split between multiple processors over several cycles, and can also be performed in parallel with the normal elements since the processing of such normal elements does not require all of the available processors.

Furthermore, note that the CBU may provide the image processing system with a tabulated list of the load balanced processing operations to be performed by a given processor. For instance, the CBU may create a table that lists which detector element is to be processed by which processor.

Figure 3:
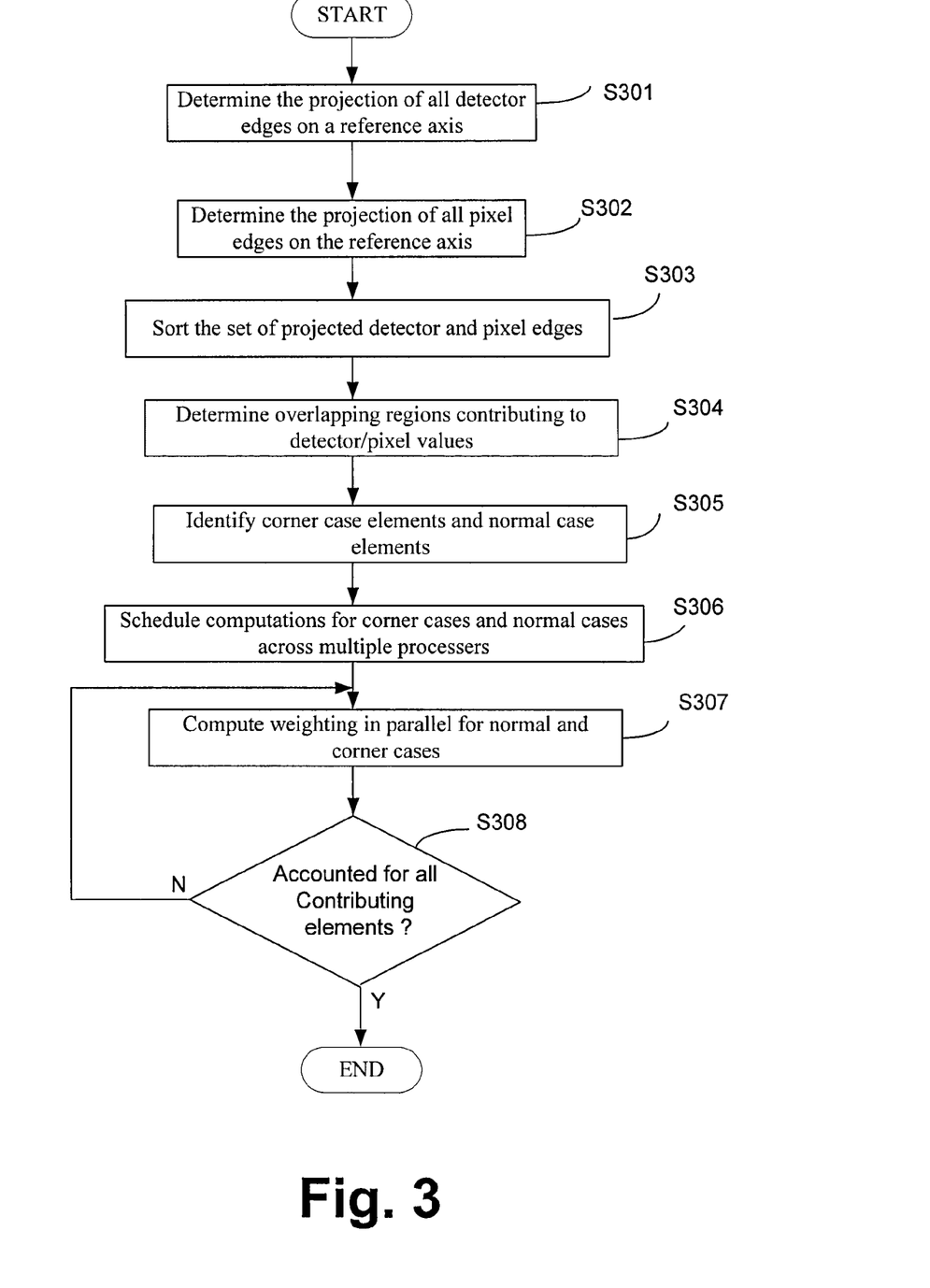
FIG. 3 is a flowchart illustrating the steps performed to improve the image processing time according to one embodiment of the disclosure.
Figure 4:
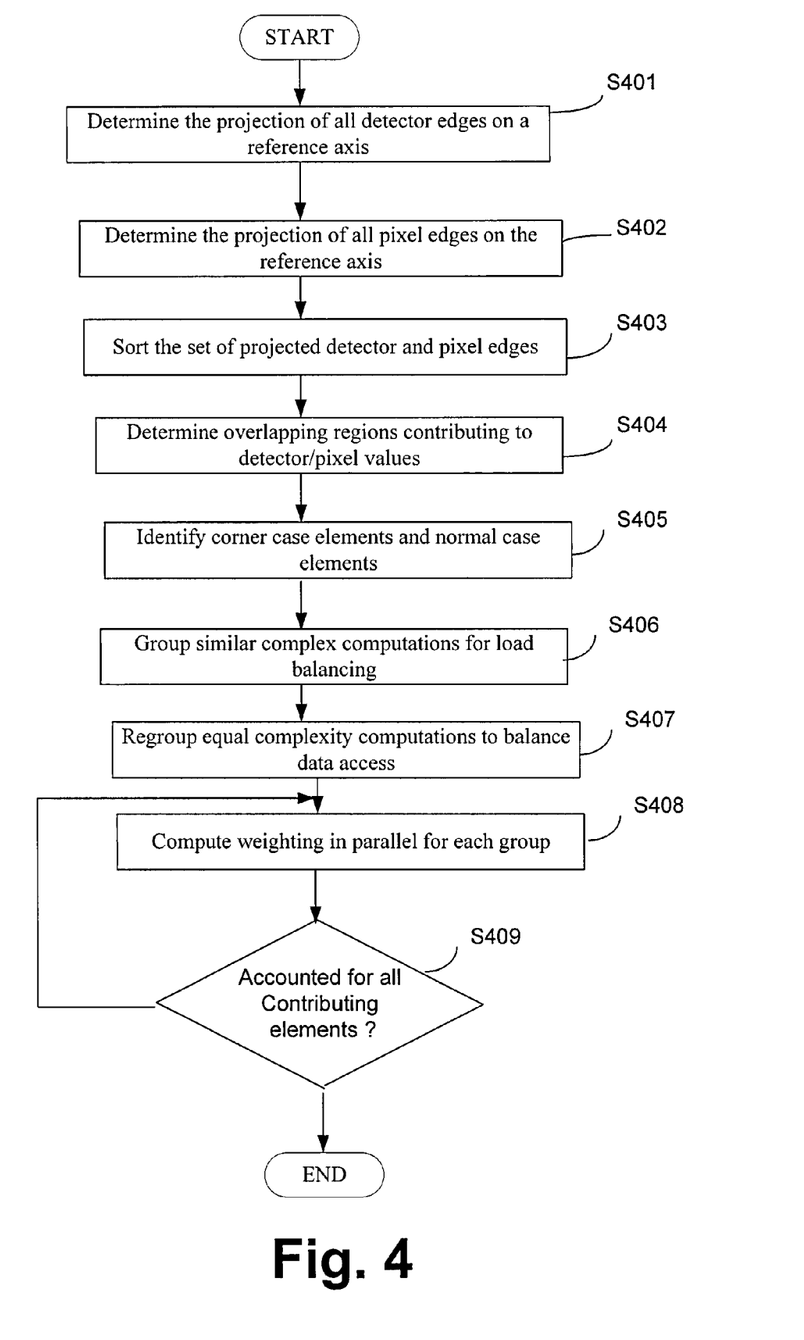
FIG. 4 is a flowchart illustrating the steps performed to improve the image processing time according to another embodiment of the disclosure.
Figure 5:
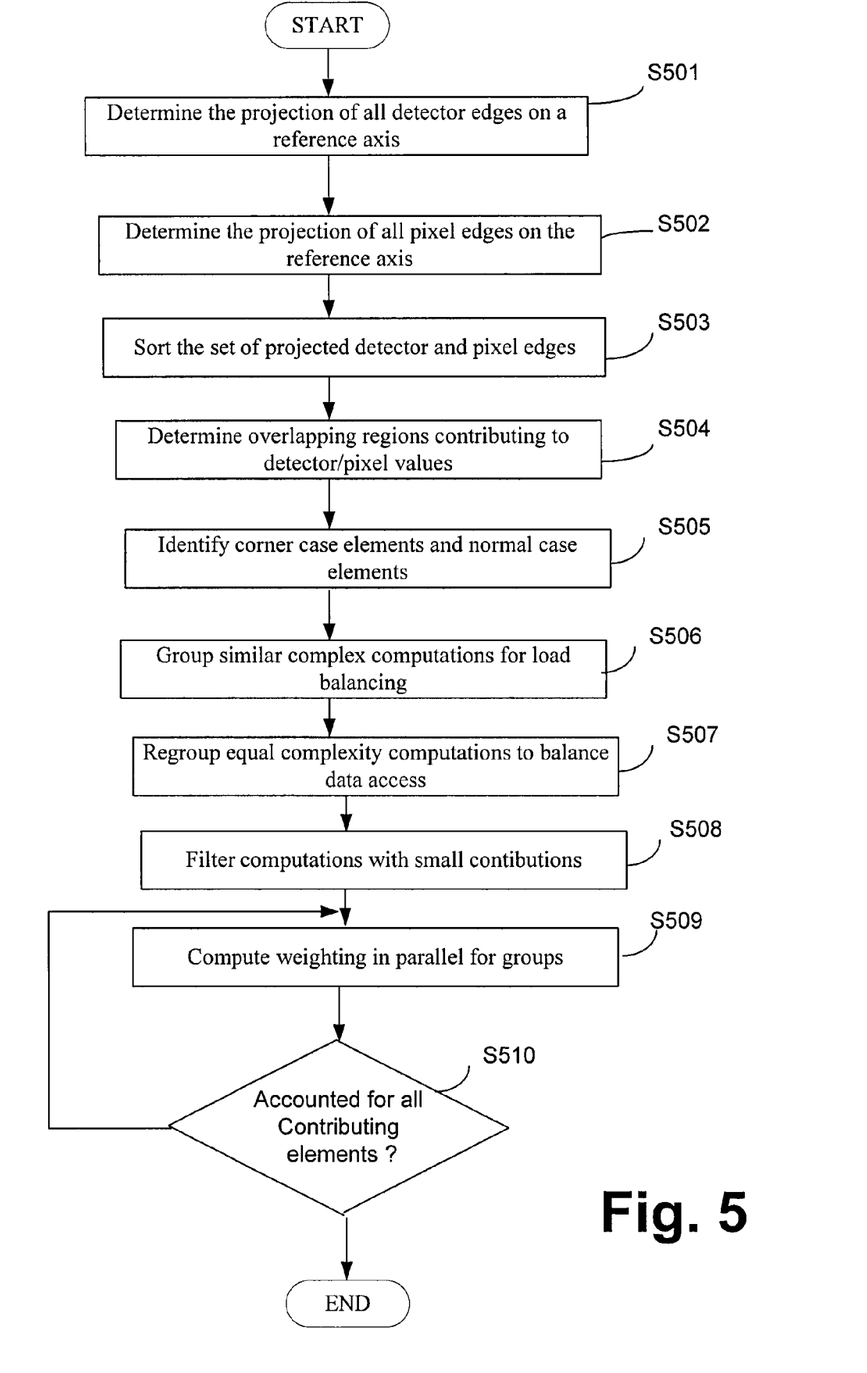
FIG. 5 is a flowchart illustrating the steps performed to improve the image processing time according to another embodiment of the disclosure.

FIGS. 3-5 depict flowcharts according to different embodiments that illustrate the steps performed by an image reconstruction system to improve the image processing time by load balancing the computation tasks across a plurality of processors.

FIG. 3 depicts a flowchart illustrating the steps performed by an image reconstruction system to improve the image processing time according to one embodiment.

In step S301, the detector edges are projected onto a predetermined reference axis. The projection of a detector edge is obtained by finding an intersection point with the reference axis, of a ray of light that emerges from the source and terminates at the edge of the detector.

In step S302, the pixel edges are projected onto the reference axis. The projection of pixel edges is obtained by finding an intersection point with the reference axis, of a ray of light that emerges from the source and passes through a pixel edge.

In step S303, the projections of the detector edges and pixel edges on the reference axis are sorted to each spatial direction.

In step S304, the CBU processes the current view under consideration and identifies the intersecting regions for each detector/pixel element. Note that, based on whether a reprojection or a backprojection is being performed, the CBU can be configured to identify the corresponding intersecting pixel/detector values.

In step S305, the CBU optionally identifies the corner case and normal case elements based on a computed average number of intersecting (overlapping) regions for all elements.

In step S306, the CBU schedules the computations to be performed to the different processors. As stated previously, the CBU may provide the image processing system with a tabulated list of the load-balanced processing operations to be performed by the different processors.

For example, some sort of classification of the cases can be used to guide the module that assigns the computation tasks to the different accelerators. In one embodiment, no classification is necessary at all and the accelerators are assigned in order by breaking up the elements as they come. This straightforward approach is not necessarily the most efficient as some elements would be potentially processed in several passes, increasing the bandwidth requirements.

The CBU scheduling can be performed in several ways, for which examples are provided below. For simplicity, assume four processors and four detector elements (d1, d2, d3, and d4) having 3, 2, 5, and 2 overlapping regions, respectively, so that the average number of overlapping regions is 3.

Example #1

1. Classify above and below average cases:
above: d3
below or equal: d1, d2, d4

2. Process all normal cases in order:
d1 (use 3 processors, 1 unused)
d2 (use 2 processors, 2 unused)
d4 (use 2 processors, 2 unused)
3. Split up above-average cases and process:
d3—first pass (use all 4 processors)
d3—second pass (use 1 processor)

Example #2

1. Classify above and below average cases:
above: d3
below or equal: d1, d2, d4
1. Process all normal cases in order and fill in the holes by splitting up above-average cases:
d1+d3(1) (use 3 processors for d1, 1 for d3)
d2+d3(2) (use 2 processors for d2, 2 for d3)
d4+d3(2) (use 2 processors for d4, 2 for d3)
2. Split up remaining above average cases (if any) and process:
[nothing in this case but it could be "d3—third pass (use 1 processor)" if d3 had 6 overlapping regions]

Example #3

1. Classify in decreasing order.
d3: 5
d1: 3
d2, d4: 2
2. Process large cases first (this splits the large cases in the smallest number of pieces possible, which could potentially reduce bandwidth requirement for example) and fill in the holes intelligently with smaller cases in order to avoid having to break them up:
d3—first pass (use all 4 processors)
d3(1)+d1(3): second pass d3, completed by d1 (use all 4 processors)
d2(2)+d4(2): d2, completed by d4 (use all 4 processors)
3. Process the remaining cases (if any):
[none here, but there could be a d5 with only 1 region for example]

Example #4

No Classification at all

1. Process all cases in order by breaking them up if necessary:
d1(3)+d2(1): d1, completed by first region of d2 (use all 4 processors)
d2(1)+d3(3): second region of d2, completed by three regions of d3 (use all 4 processors)
d3(2)+d4(2): last regions of d3, completed by d4 (use all 4 processors)

As shown above, there are many ways to schedule the computations across accelerators, each of which has advantages and drawbacks, especially for computation speed (number of cycles to perform) and bandwidth optimization. The scheduling can be performed in different ways based on what will work best for a particular system, e.g., depending on the size of the computational system, or the size of the volume or detector array.

In step S307, the image processing system performs a weighting process to compute the detector/pixel element values. Specifically, if a reprojection is being performed, the image processing system sums all the pixel values that are multiplied with a corresponding weight, wherein the weight is equal to the length of the pixel edges that overlap with the current detector edges (i.e., whose detector value is being computed) along the reference axis. Similarly, if the back-projection operation is being performed, the image processing system performs a summation of all detector values multiplied with a corresponding weight to compute the pixel value. Note that in step S307, the image processing system performs the weighting process in parallel for normal and corner case elements based on the processing schedule determined by the CBU in step S306.

In step S308, a query is made to check if all the normal and corner elements have been accounted for in the computation of the detector/pixel values. If the response to the query in step S308 is negative, the process simply loops back to step S307. If the response to the query is affirmative, the process simply terminates.

FIG. 4 depicts a flowchart illustrating the steps performed by an image reconstruction system to improve the image processing time according to another embodiment.

In FIG. 4, steps S401-S405 are similar to the steps S301-S305 of FIG. 3, and therefore the description of these steps is omitted here.

In step S406, the CBU groups computations that have a similar degree of complexity. Specifically, the CBU can group similar complex computations in order to achieve load balancing across the set of processors. Further, the CBU can maintain a table that lists which detector elements and which overlapping (intersecting) regions corresponding to the detector element have a similar degree of complexity. Note that, for a particular detector element, the number of overlapping regions directly identifies the number of multiplication operations to be executed, thereby determining the computation complexity of the detector element.

In step S407, the CBU regroups equal complex computations to balance data access patterns. Specifically, computations requiring the same data set are grouped together so that the processors implementing the respective computations can share the same data, thereby reducing the number of data accesses.

Further, steps S408 and S409 are similar to steps S307 and S308 of FIG. 3, respectively. However, in the present embodiment, the weighting computations are performed in parallel (step S408) for the groups created in steps S406 and S407, rather than performing the computations in parallel based on normal and corner case elements, as performed in the process of FIG. 3.

FIG. 5, depicts according to another embodiment, a flowchart illustrating the steps performed by an image reconstruction system to improve the image processing times.

FIG. 5 depicts steps that are similar to the steps depicted in FIG. 4. However, after forming groups of like and equal-complexity computations in steps S506 and S507, respectively, in step S508 the CBU is further configured to filter the computations that have small contributions towards the detector/pixel value that is currently being computed. In doing so, the number of computation operations that the CT image processing system needs to perform are reduced, thereby improving the overall system performance.

Figure 6:
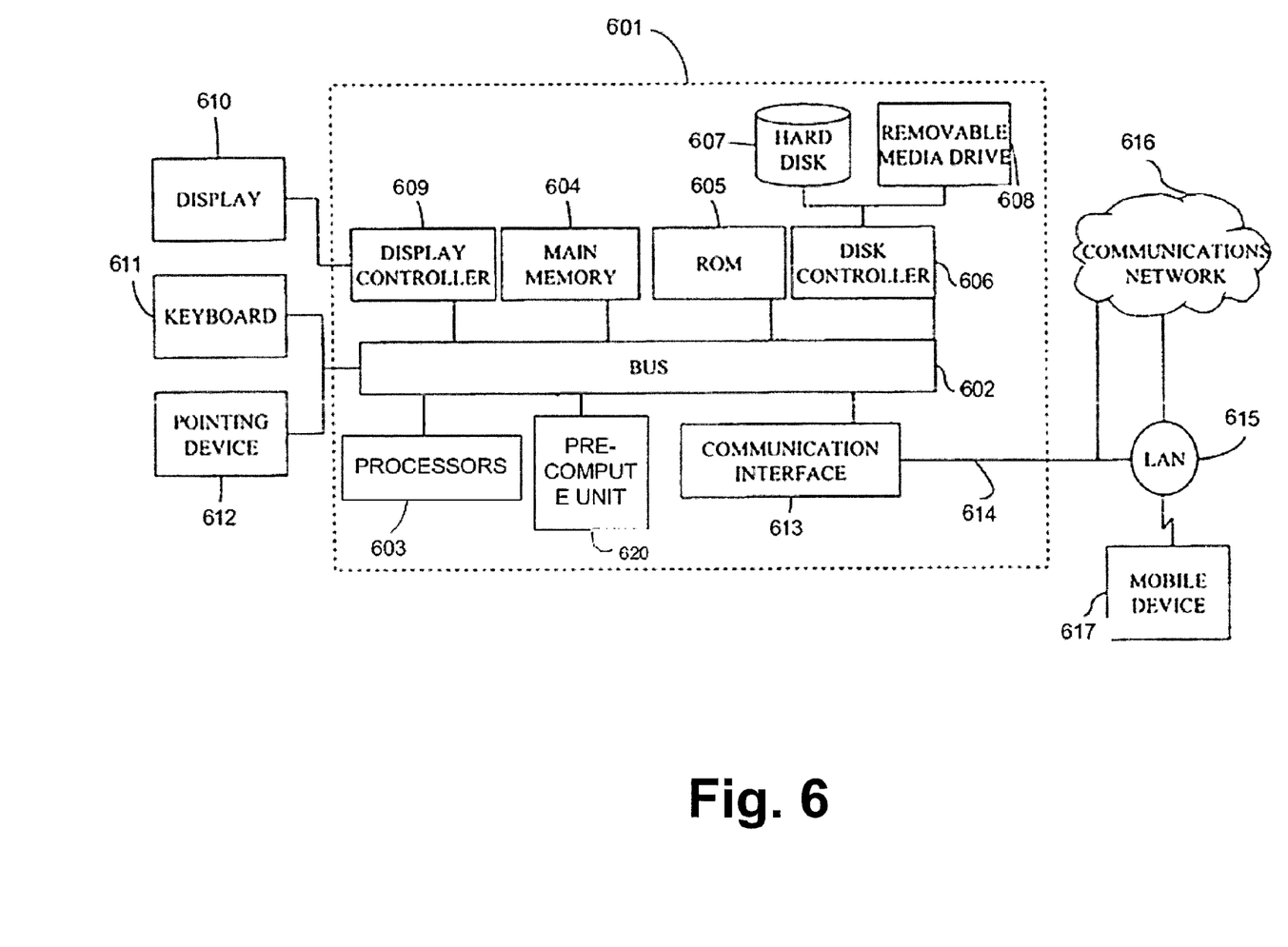
FIG. 6 illustrates a computer system that may be used to control a CT apparatus and upon which embodiments of the present disclosure may be implemented.

The CT system described herein can be controlled using a computer processing apparatus or programmable logic. FIG. 6 illustrates a computer system 601 that functions as a controller configured to control, for example, motors that engage a CT apparatus. An operator may, for example, set various parameters (e.g., set angle, set linear position, set slew rate, etc.) via a user interface, and a plurality of processors 603 of computer system 601 may control the apparatus 10 via an interface based on the set parameters.

The computer system 601 may include a pre-computing unit that is configured to perform the pre-processing operations while implementing, for example, the reprojection backprojection processes. The processors 603, can be configured to carry out multiple operations or computations tasks in a parallel manner. Further, the computer system 601 includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 601 may also include a display controller 609 coupled to the bus 602 to control a display 610, for displaying information to a computer user. The computer system includes input devices, such as a keyboard 611 and a pointing device 612, for interacting with a computer user and providing information to the processor 603. The pointing device 612, for example, may be a mouse, a trackball, a finger for a touch screen sensor, or a pointing stick for communicating direction information and command selections to the processor 603 and for controlling cursor movement on the display 610.

The processor 603 executes one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes. Stored on any one or on a combination of computer readable media, the present disclosure includes software for controlling the computer system 601, for driving a device or devices for implementing the invention, and for enabling the computer system 601 to interact with a human user. Such software may include, but is not limited to, device drivers, operating systems, and applications software. Such computer readable media further includes the computer program product of the present disclosure for performing all or a portion (if processing is distributed) of the processing performed in implementing the invention. The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 603 for execution. A computer readable medium may take many forms, including but not limited to, non-volatile media or volatile media. Non-volatile media includes, for example, optical, magnetic disks, and magneto-optical disks, such as the hard disk 607 or the removable media drive 1208. Volatile media includes dynamic memory, such as the main memory 604. Transmission media, on the contrary, includes coaxial cables, copper wire and fiber optics, including the wires that make up the bus 602. Transmission media also may also take the form of acoustic or light waves, such as those generated during radio wave and infrared data communications.

Various forms of computer readable media may be involved in carrying out one or more sequences of one or more instructions to processor 603 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 601 may receive the data on the telephone line and place the data on the bus 602. The bus 602 carries the data to the main memory 604, from which the processor 603 retrieves and executes the instructions. The instructions received by the main memory 604 may optionally be stored on storage device 607 or 608 either before or after execution by processor 603.

The computer system 601 also includes a communication interface 613 coupled to the bus 602. The communication interface 613 provides a two-way data communication coupling to a network link 614 that is connected to, for example, a local area network (LAN) 616, or to another communications network 616 such as the Internet. For example, the communication interface 613 may be a network interface card to attach to any packet switched LAN. As another example, the communication interface 613 may be an integrated services digital network (ISDN) card. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local network 616 (e.g., a LAN) or through equipment operated by a service provider, which provides communication services through a communications network 616. The local network 616 and the communications network 616 use, for example, electrical, electromagnetic, or optical signals that carry digital data streams, and the associated physical layer (e.g., CAT 6 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as un-modulated baseband data through a "wired" communication channel and/or sent within a predetermined frequency band, different than baseband, by modulating a carrier wave. The computer system 601 can transmit and receive data, including program code, through the network(s) 616 and 616, the network link 614 and the communication interface 613. Moreover, the network link 614 may provide a connection through a LAN 616 to a mobile device 617 such as a personal digital assistant (PDA) laptop computer, or cellular telephone.

While some of the embodiments described above are directed to CT scanning systems, the present inventions are not limited thereto, but can be applied to other modalities, including, e.g., cardiovascular X-ray and CT.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of reducing computation time in distance-driven reprojection from an image space having a plurality of pixels for a scanning system, the scanning system including a detector having a plurality of detector elements, the method comprising:
    determining, for a given view and for each detector element of the plurality of detector elements, a projection location of each edge of the detector element onto a predetermined reference axis;
    determining, for the given view and for each pixel of the plurality of pixels, a projection location of each edge of the pixel onto the predetermined axis;
    identifying, for each detector element, contributing pixels having corresponding pixel values that contribute to a detector value of the detector element, based on the projection location of each edge of the detector element and the projection location of each edge of the plurality of pixels;
    scheduling parallel computations for the detector elements in each processing cycle of the scanning system, based on a number of processors included in the scanning system; and
    calculating, based on the scheduled parallel computations, the detector value of each detector element as a sum, over the total number of contributing pixels, of the corresponding pixel values of the contributing pixels, each pixel value being weighted by a corresponding weight.

2. The method of claim 1, further comprising:
    sorting the projection locations of the edges of the detector elements and the projection locations of the pixel edges on the predetermined reference axis.

3. The method of claim 1, wherein the step of determining the projection location of each edge of each detector element on the predetermined reference axis comprises determining an intersection point with the predetermined reference axis of a ray connecting an X-ray source and the edge of the detector element.

4. The method of claim 1, wherein the step of determining the projection location of each edge of each pixel comprises determining an intersection point with the predetermined reference axis of a ray connecting an X-ray source of light and a mid-point of the pixel edge.

5. The method of claim 1, further comprising setting a predetermined threshold value to an average number of contributing pixels of all detector elements.

6. The method of claim 5, further comprising classifying a detector element as a first type of detector element when the total number of contributing pixels for the detector element is less than the predetermined threshold value, and classifying the detector element as a second type of detector element when the total number of contributing pixels for the detector element is greater than the predetermined threshold value.

7. The method of claim 1, wherein the calculating step comprises calculating, for each detector element, the weight of each pixel in the contributing pixels as an amount of intersection between a first segment defined by the projection locations of the edges of the pixel on the predetermined reference axis and a second segment defined by the projection locations of the edges of the detector element on the predetermined reference axis, divided by the length of the second segment.

8. The method of claim 1, wherein the calculating step comprises calculating, for each detector element j, the detector value $d_{j,j+1}$ as:

$$d_{j,j+1} = \frac{\sum_{i=1}^{l} p_{i,i+1} \cdot |(p_i, p_{i+1}) \cap (d_j, d_{j+1})|}{d_{j+1} - d_j}$$

wherein $d_j$, and $d_{j+1}$ are the projection locations of the edges of the detector element on the predetermined reference axis, $p_{i,i+1}$ is the pixel value of the ith contributing pixel for the detector element, $p_i$ is the projection location of a first edge of the ith contributing pixel for the detector element, and $p_{i+1}$ is the projection location of a second edge of the ith contributing pixel for the detector element.

9. The method of claim 1, further comprising:
    grouping computations for the detector elements based on complexity; and
    regrouping equal complexity computations based on data required to perform the computation.

10. The method of claim 1, further comprising:
    filtering computations for the detector elements based on a resultant value of computation.

11. The method of claim 10, wherein the filtering step comprises filtering the computation if the resultant value of the computation is less than a threshold value.

12. The method of claim 1, further comprising:
    classifying each detector element as a first type of detector element or a second type of detector element based on a total number of contributing pixels for each detector element and a predetermined threshold value,
    wherein the scheduling step comprises scheduling the parallel computations for the first type of detector elements and the second type of detector elements in each processing cycle of the scanning system, based on the number of processors included in the scanning system.

13. A scanning apparatus, comprising:
a detector including a plurality of detector elements; and
a processing circuit configured to
   determine, for a given view and for each detector element of the plurality of detector elements, a projection location of each edge of the detector element onto a predetermined reference axis;
   determine, for the given view and for each pixel of a plurality of pixels in an image space, a projection location of each edge of the pixel onto the predetermined axis;
   identify, for each detector element, contributing pixels having corresponding pixel values that contribute to a detector value of the detector element, based on the projection location of each edge of the detector element and the projection location of each edge of the plurality of pixels;
   schedule parallel computations for the detector elements in each processing cycle of the scanning apparatus, based on a number of processors included in the scanning apparatus; and
   calculate, based on the scheduled parallel computations, the detector value of each detector element as a sum, over the total number of contributing pixels, of the corresponding pixel values of the contributing pixels, each pixel value being weighted by a corresponding weight.

14. A non-transitory computer readable medium having stored thereon a program that, when executed by a computer, causes the computer to perform a method of reducing computation time in distance-driven reprojection from an image space having a plurality of pixels for a computed-tomography scanning system, the scanning system including a detector having a plurality of detector elements, the method comprising:
   determining, for a given view and for each detector element of the plurality of detector elements, a projection location of each edge of the detector element onto a predetermined reference axis;
   determining, for the given view and for each pixel of the plurality of pixels, a projection location of each edge of the pixel onto the predetermined axis;
   identifying, for each detector element, contributing pixels having corresponding pixel values that contribute to a detector value of the detector element, based on the projection location of each edge of the detector element and the projection location of each edge of the plurality of pixels;
   scheduling parallel computations for the detector elements in each processing cycle of the scanning system, based on a number of processors included in the scanning system; and
   calculating, based on the scheduled parallel computations, the detector value of each detector element as a sum, over the total number of contributing pixels, of the corresponding pixel values of the contributing pixels, each pixel value being weighted by a corresponding weight.

15. A method of reducing computation time in distance-driven backprojection from a detector space to an image space having a plurality of pixels for a scanning system, the scanning system including a detector having a plurality of detector elements, the method comprising:
   determining, for a given view and for each detector element of the plurality of detector elements, a projection location of each edge of the detector element onto a predetermined reference axis;
   determining, for the given view and for each pixel of the plurality of pixels, a projection location of each edge of the pixel onto the predetermined axis;
   identifying, for each pixel of the plurality of pixels, contributing detector elements having corresponding detector values that contribute to a pixel value of the pixel, based on the projection location of each edge of the detector element and the projection location of each edge of the plurality of pixels;
   scheduling parallel computations for the pixels in each processing cycle of the scanning system, based on a number of processors included in the scanning system; and
   calculating, based on the scheduled parallel computations, the pixel value of each pixel as a sum, over the total number of contributing detector elements, of the corresponding detector values of the contributing detector elements, each detector value being weighted by a corresponding weight.

16. A scanning apparatus, comprising:
a detector including a plurality of detector elements; and
a processing circuit configured to
   determine, for a given view and for each detector element of the plurality of detector elements, a projection location of each edge of the detector element onto a predetermined reference axis;
   determine, for the given view and for each pixel of a plurality of pixels, a projection location of each edge of the pixel onto the predetermined axis;
   identify, for each pixel of the plurality of pixels, contributing detector elements having corresponding detector values that contribute to a pixel value of the pixel, based on the projection location of each edge of the detector element and the projection location of each edge of the plurality of pixels;
   schedule parallel computations for the pixels in each processing cycle of the scanning apparatus, based on a number of processors included in the scanning apparatus; and
   calculate, based on the scheduled parallel computations, the pixel value of each pixel as a sum, over the total number of contributing detector elements, of the corresponding detector values of the contributing detector elements, each detector value being weighted by a corresponding weight.

17. A non-transitory computer readable medium having stored thereon a program that, when executed by a computer, causes the computer to perform a method of reducing computation time in distance-driven backprojection from a detector space to an image space having a plurality of pixels for a computed-tomography scanning system, the scanning system including a detector having a plurality of detector elements, the method comprising:
   determining, for a given view and for each detector element of the plurality of detector elements, a projection location of each edge of the detector element onto a predetermined reference axis;
   determining, for the given view and for each pixel of the plurality of pixels, a projection location of each edge of the pixel onto the predetermined axis;
   identifying, for each pixel of the plurality of pixels, contributing detector elements having corresponding detector values that contribute to a pixel value of the pixel, based on the projection location of each edge of the detector element and the projection location of each edge of the plurality of pixels;

scheduling parallel computations for the pixels in each processing cycle of the scanning system, based on a number of processors included in the scanning system; and calculating, based on the scheduled parallel computations, the pixel value of each pixel as a sum, over the total number of contributing detector elements, of the corresponding detector values of the contributing detector elements, each detector value being weighted by a corresponding weight.

\* \* \* \* \*